INVENTOR.
JOHN W. BARNES
BY
OSTROLENK, FABER, GERB & SOFFEN
ATTORNEYS

United States Patent Office 3,449,587
    Patented June 10, 1969

3,449,587
    FIBRE OPTIC SCANNER DEVICE FOR NAVIGATIONAL INSTRUMENTS
    John W. Barnes, Floral Park, Queens, N.Y., assignor to Kollsman Instrument Corporation, Elmhurst, N.Y., a corporation of New York
    Filed Feb. 11, 1965, Ser. No. 431,822
    Int. Cl. H01j 39/12
    U.S. Cl. 250—227                        3 Claims

ABSTRACT OF THE DISCLOSURE

A scanning device in which a fibre optic filament is oscillated by a magnetic driving structure, with the oscillating end of the fibre optic element scanning the image of an object to be tracked. If the image moves to one side or another of the null position of the fibre optic scanner, error signals are generated to adjust the null position axis.

---

This invention relates to a light source scanning device, and more particularly relates to a scanning device wherein the end of an optical fibre is oscillated in the plane of the image of a light source to be tracked, and transmits the intensity incident upon the scanning end of the fibre optics to a photosensitive element located at the other end of the fibre optics, whereupon the variation in light intensity is functionally related to the position of the light source with respect to the axis of the scanning device.

Light source tracking devices, commonly termed "star trackers" are well known to the art, and generally include some type of scanning system for scanning the image of the light source to be tracked. Thus, when the scanning means moves with respect to the image, the transmitted light intensity will repetitively vary to yield information as to the amount of variation of the axis of an optical system from the light source being tracked and the direction of this variation. Such devices are shown in U.S. Patent 3,244,886, in the name of Jacob S. Zuckerbraun, entitled Light Modulation System for Photosensitive Light Tracking Device, which issued Apr. 5, 1966, and is assigned to the assignee of the instant invention.

Such devices commonly have many moving parts and thus are subject to mechanical failure. In particular, where these devices are operated in space and thus subject to hard vacuum and low temperature, such moving parts are subject to failure.

The priniciple of the present invention is to provide a novel scanning device wherein only a single moving component is provided which is an oscillating optical fibre which has one end thereof movable in the plane of the image of the light source to be tracked. This optical fibre is then suspended from its other end which is placed adjacent a light-sensitive device, whereupon the light incident upon the oscillating end of the optical fibre is transmitted through the fibre and upon the light-sensing device which converts the variation in light intensity into suitable electrical signals.

The optical fibre used in accordance with the invention is freely suspended and oscillates without mechanically rubbing or engaging any other component. Thus, problems of lubrication and mechanical wear are eliminated.

While the invention is described herein with reference to star tracking applications, it will be noted that the application of the novel scanning mechanism of the invention may be extended generally to any two-dimensional image scanning system for photometric or display purposes.

Accordingly, a primary object of this invention is to provide a novel light modulation means which is compatible with micro-packing techniques, requires low power and occupies little volume, while providing long life when used in celestial navigation applications.

Another object of this invention is to provide a novel optical fibre or "light-pipe" which serves as a moving field stop for light scanning equipment.

Yet another object of this invention is to provide a novel light tracking device in which the light modulation means consists of an oscillating optical fibre suspended at one end thereof which has its other end oscillated in the plane of the image of the light source being tracked.

These and other objects of this invention will become apparent from the following description when taken in connection with the drawings, in which.

Figure 5:
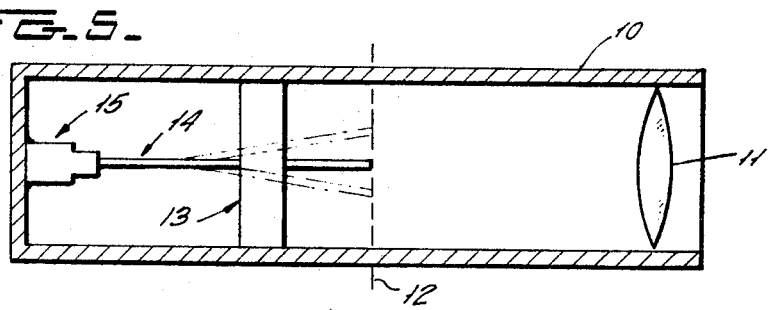
FIGURE 5 is a cross-sectional view through a mounting housing which mounts the scanning mechanism and telescope means for producing an image of the light source to be tracked.

Referring first to FIGURE 5, I have illustrated therein a light tracking system which comprises a mounting tube 10 which has a suitable object lens system 11 which focuses the image of the light source being tracked in an image plane shown by the dotted lines 12.

A scanning mechanism which includes a magnetic drive system 13, an optical fibre 14 and a support means 15 is then provided wherein the optical fibre 14 is suspended at its left-hand end in the support means 15 which defines both a support for the fibre 14 and for a light-sensing device. Note that support means 15 is rigidly supported within housing 10, as is the scanning means 13. The right-hand end of fibre 14 is then oscillatible between the two dotted lines positions of FIGURE 5 with the end thereof moving in the image plane 12.

Figure 2:
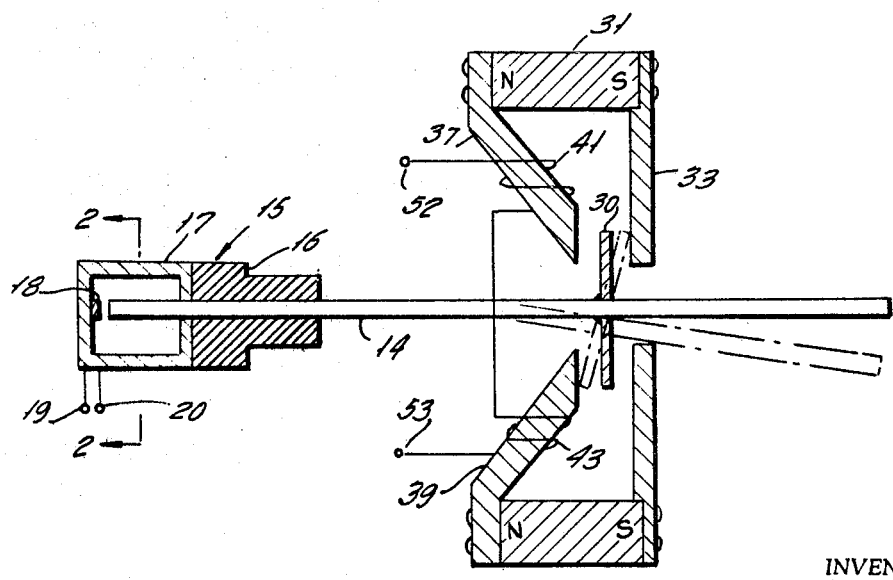
FIGURE 2 is a cross-sectional view of the assembled mechanism of FIGURE 1 in conjunction with the suspended optical fibre which is oscillated by the magnetic drive system.
Figure 4:
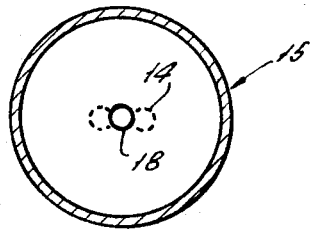
FIGURE 4 is a cross-sectional view of FIGURE 2 taken across the line 2—2 in FIGURE 4, and particularly illustrates the excursion of the opposite end of the optical fibre with reference to the stationarily positioned photo-sensing device.

The support means 15 is further illustrated in FIGURES 2 and 4 as comprising a metallic housing 16 which is rigidly secured to the optical fibre 14. A hermetically sealing housing 17 is then secured to the left-hand end of metallic body 16, and contains therein a suitable photo-sensing means 18 which could, for example, be a silicon photo-diode of any desired type. The output leads of the photo-diode 18 are then connected to terminals 19 and 20 which provide electrical signals related to the modulation of the light source in a manner to be described hereinafter.

As illustrated in FIGURE 4, the optical fibre 14 will move through a total excursion of the order of twice the diameter of the optical fibre 14.

The optical fibre 14 is more specifically formed in a particular embodiment of the invention of a fibre of high index glass material clad with low index glass material having a length of 2 inches and a diameter of .02 inch.

Figure 1:
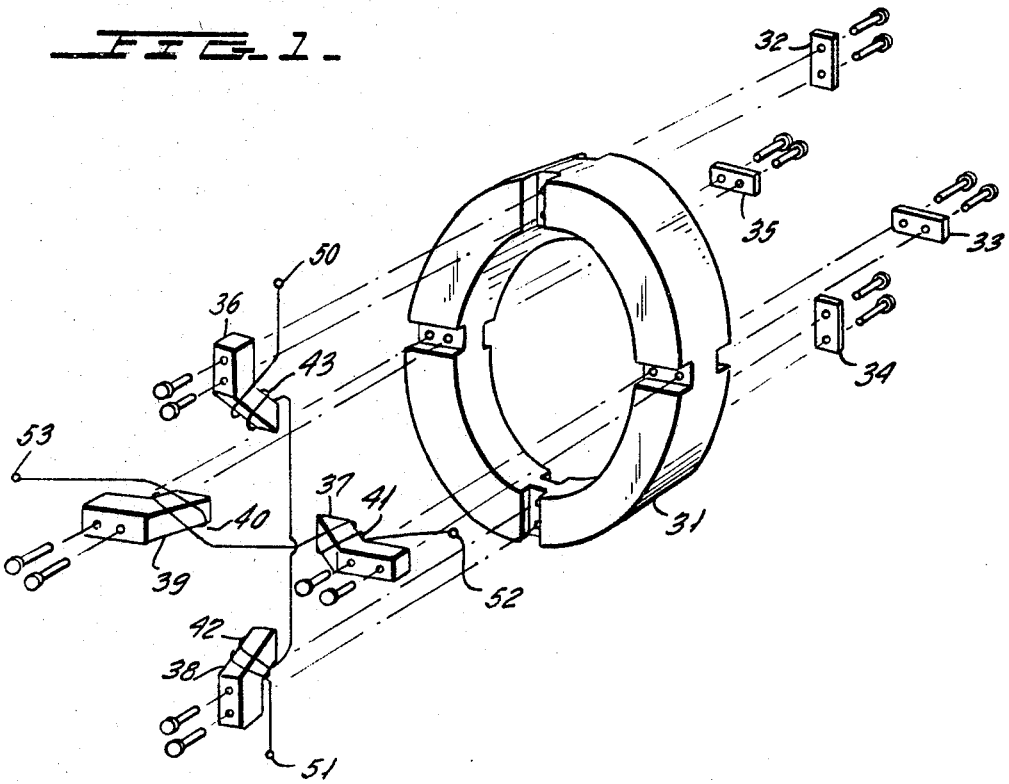
FIGURE 1 is an exploded perspective view of the magnetic oscillating means used for oscillating an optical fibre in accordance with the invention.
Figure 3:
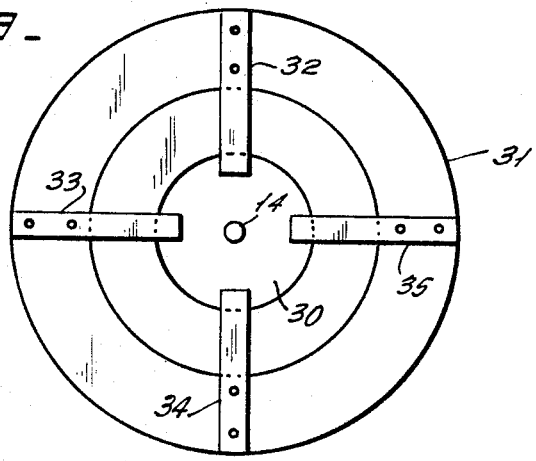
FIGURE 3 is a side view of the apparatus of FIGURE 2 when seen from the right-hand side thereof.

The oscillating system for causing the optical fibre 14 to oscillate between the dotted line position schematically shown in FIGURES 2, 4 and 5 is illustrated in detail in FIGURES 1, 2 and 3. Thus, the magnetic drive system first includes a magnetic disk 30 (FIGURES 2 and 3) which is suspended from optical fibre 14 and directly secured thereto. The driving system for effecting motion of disk 30 and thus the fibre 14 includes a permanent magnet 31 which has four rear pole pieces 32, 33, 34 and 35 secured thereto as by suitable screw means, and four front pole pieces 36, 37, 38 and 39 which are secured to the opposite surface of permanent magnet 31 as by any suitable securing screw means. Each of pole pieces 36 through 39 then have windings 40, 41, 42 and 43 wound thereon.

The windings 40 and 42 are then connected in series with one another, and with terminals 50 and 51 which are connected to a suitable A-C source. In a similar manner, windings 41 and 43 are connected in series with one another and terminate at terminals 52 and 53 which are again connected to some suitable A-C source. Moreover, the pairs of windings 40–42 and 41–43 are so wound that when the flux generated in one winding opposes the flux from permanent magnet 31, the flux in the opposite winding is in the same direction as the flux of magnet 31.

It is now possible to consider the operation of the drive structure and scanning mechanism. Assuming first that scanning is desired only in one direction so that the optical fibre 14 will oscillate in a plane with simple harmonic motion, an A-C source is connected to terminals 52 and 53 which will oscillate fibre 14 at some predetermined frequency such as a frequency somewhat lower than the natural resonance frequency of the fibre 14 and disk 30.

When the flux in pole 37 is decreased due to the instantaneous ampere turns of winding 41, the flux of pole 39 will be increased. Therefore, the magnetic disk 30 will tend to move closer to the end of pole piece 39 and to the end of pole piece 32 so that it will move to the dotted line position shown in FIGURE 2. At the same time, the optical fibre 14 will deflect downwardly, as illustrated in dotted lines.

When the A-C current applied to terminals 52 and 53 reverses, an opposite effect will occur so that the magnetic disk 30 will move upwardly with the upper end of disk 30 moving closer to pole pieces 36 and its lower end moving closer to pole pieces 34. Thus, the disk 30 and optical fibre 14 will oscillate with a frequency of the A-C source connected to terminals 52 and 53.

The free end of the optical fibre 14 will, therefore, scan within the image plane 12, whereupon if the image of the object being tracked lies on the optical axis or rest position of objective lens system 11 and fibre 14, the image transmitted along optical fibre 14 will have an intensity modulation frequency which is twice the frequency of the scanning motion of optical fibre 14, and this double frequency output will appear at terminals 19 and 20. If, however, the image moves away from the optical axis or the rest axis of fibre 14, then the light transmitted along optical fibre 14 to the photosensitive element will be modulated by a frequency equal to the scanning frequency of the optical fibre 14. Note that the direction in which the image is moved away from the center or rest position of fibre 14 will be determined by the phase of the modulation frequency signal applied to the photosensitive means 18.

Therefore, the novel system, when used for single axis scanning, will deliver an identifiable double frequency signal when the image is properly aligned along the axis of the light scanning means, and will deliver scanning frequency signals having a phase related to the direction of the displacement of the optical image from the rest axis of fibre 14 when the optical image is displaced.

In order to obtain both azimuth and altitude information, i.e., scanning in orthogonal directions, a second scanning mode can be provided by alternately energizing windings 40 and 42 which will cause the optical fibre 14 to scan in the direction perpendicular to that previously described. Thus, both altitude and azimuth information can be obtained by alternately scanning in these two modes.

Furthermore, simultaneous energization of windings 40 through 43 will cause the optical fibre 14 to move in a Lissajous scanning pattern determined by the selected amplitudes and frequencies of the drive voltages, whereupon both altitude and azimuth information can be derived from the output signal at terminals 19 and 20 in the manner set forth in U.S. Patent 3,244,886 noted above.

Although this invention has been described with respect to its preferred embodiments, it should be understood that many variations and modifications will now be obvious to those skilled in the art, and it is preferred, therefore, that the scope of the invention be limited not by the specific disclosure herein but only by the appended claims.

The embodiments of the invention in which an exclusive privilege or property is claimed are defined as follows:

1. A light source scanning device comprising objective means for forming an image of a light source to be tracked, an elongated optical fibre having a first and second end, a photosensitive means, and a drive means connected to said optical fibre for oscillating at least said first end of said elongated optical fibre; said first end of said elongated fibre being in the image plane of said objective means and being oscillatable in a direction parallel to said image plane; said first end of said elongated fibre having a rest position lying on the optical axis of said objective means; said photosensitive means positioned adjacent said second end of said optical fibre; said drive means oscillating said first end of said optical fibre between positions symmetrically displaced from its said rest position.

2. The device substantially as set forth in claim 1 which includes stationary support means connected to said second end of said optical fibre; said optical fibre being freely supported for vibratory motion from its said second end.

3. The device substantially as set forth in claim 2 wherein said drive means includes a magnetic disk secured to an intermediate portion of said optical fibre and extending perpendicularly from the axis of said optical fibre and a drive magnet spaced from said magnetic disk for oscillating said disk.

References Cited

UNITED STATES PATENTS 3,224,279  12/1965  Galli et al.
3,240,106  3/1966  Hicks _____ 250—227 X

FOREIGN PATENTS 696,255  8/1953  Great Britain.

JAMES W. LAWRENCE, *Primary Examiner.*

C. R. CAMPBELL, *Assistant Examiner.*

U.S. Cl. X.R.

88—1; 250—203, 234